United States Patent
He et al.

(10) Patent No.: US 11,671,293 B2
(45) Date of Patent: Jun. 6, 2023

(54) DEVICE AND METHOD FOR IMPLEMENTING ANTENNA PING FUNCTION

(71) Applicants: PROSE TECHNOLOGIES (SUZHOU) CO., LTD., Suzhou (CN); PROSE TECHNOLOGIES LLC, Mount Olive, NJ (US)

(72) Inventors: Jifa He, Suzhou (CN); Ze Liu, Suzhou (CN); Zhiqiang Li, Suzhou (CN); Zhicheng Xiang, Suzhou (CN); Wencai Jing, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 10 days.

(21) Appl. No.: 17/541,659

(22) Filed: Dec. 3, 2021

(65) Prior Publication Data
US 2022/0094579 A1 Mar. 24, 2022

Related U.S. Application Data

(63) Continuation of application No. PCT/CN2020/088930, filed on May 7, 2020.

(51) Int. Cl.
*H04L 27/04* (2006.01)
*H04L 1/00* (2006.01)
*H04L 27/06* (2006.01)

(52) U.S. Cl.
CPC ............ *H04L 27/04* (2013.01); *H04L 1/0076* (2013.01); *H04L 27/06* (2013.01)

(58) Field of Classification Search
CPC ........ H04L 27/04; H04L 27/06; H04L 1/0076
See application file for complete search history.

(56) References Cited

U.S. PATENT DOCUMENTS

2017/0207527 A1* 7/2017 Lee ..................... H01Q 3/08

FOREIGN PATENT DOCUMENTS

| CN | 104067443 A | 9/2014 |
| CN | 107453934 A | 12/2017 |
| WO | 2013108938 A1 | 7/2013 |

* cited by examiner

*Primary Examiner* — Rahel Guarino
(74) *Attorney, Agent, or Firm* — Anova Law Group, PLLC

(57) ABSTRACT

A device for implementing an antenna Ping function includes a primary module and a secondary module. The secondary module includes a secondary controller, a multiplexer, a first On-Off Keying (OOK) modem, a second OOK modem connected to the secondary controller and a corresponding multiplexer, and a plurality of antenna radio frequency (RF) ports. The multiplexer is connected to the plurality of antenna RF ports. The primary module is connected to the secondary controller through the first OOK modem. The primary module receives a Ping command transmitted by a base station, generates a Ping message, and transmits the Ping message to the secondary controller through the first OOK modem. The secondary controller transmits the received Ping message to the second OOK modem. The second OOK modem transmits the Ping message to a corresponding antenna RF port through the multiplexer. The antenna RF port feeds back a signal to the base station.

18 Claims, 1 Drawing Sheet

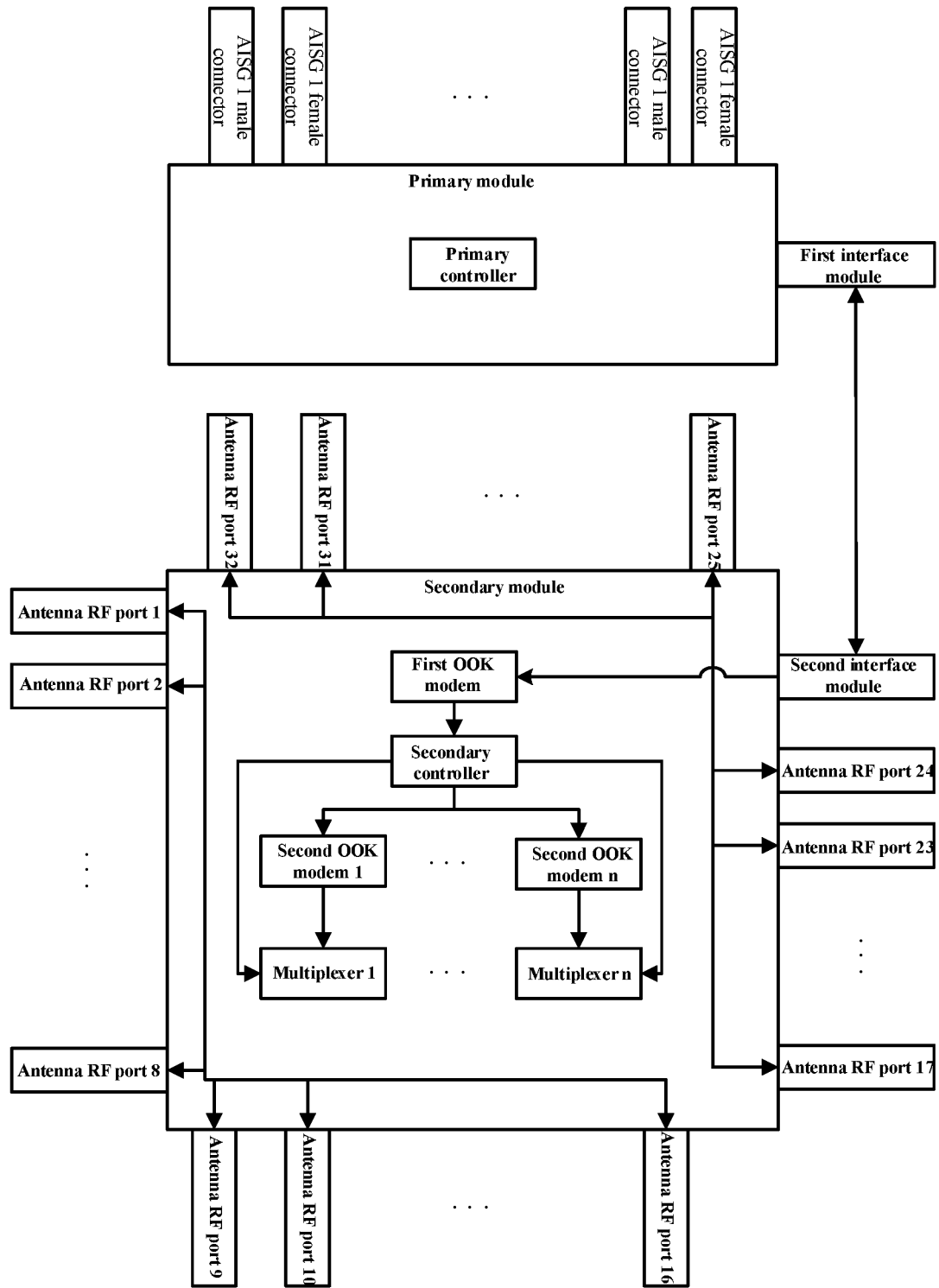

DEVICE AND METHOD FOR IMPLEMENTING ANTENNA PING FUNCTION

CROSS-REFERENCE TO RELATED APPLICATION

This application is a continuation application of International Application No. PCT/CN2020/088930, filed on May 7, 2020, the entire content of which is incorporated herein by reference.

TECHNICAL FIELD

The present disclosure generally relates to the antenna technology field and, more particularly, to a device and a method for realizing an antenna Ping function.

BACKGROUND

A Ping command is used to check stability of an antenna radio frequency (RF) port. Each antenna RF port corresponds to a modem chip in the existing device for implementing the antenna Ping function. When the antenna Ping function is performed, a signal transmitted by a base station is processed by the modem in the device and then reaches the antenna RF port. Then, the antenna RF port feeds the signal back to the base station to detect the stability of the antenna RF port. Arranging a plurality of modem chips in a one-to-one correspondence to the antenna RF ports has the following disadvantages: (1) the plurality of modem chips occupy a large space inside the antenna, which affects layout designs of other components and causes waste of costs and resources; and (2) Since each modem chip has a certain power consumption during operation, overall power consumption of the antenna may be easily increased.

Therefore, a device for implementing the antenna Ping function that can reduce the space occupied in the antenna and lower the cost and power consumption is urgently desired.

SUMMARY

Embodiments of the present disclosure provide a device for implementing an antenna Ping function, including a primary module and a secondary module. The secondary module includes a secondary controller, a multiplexer, a first On-Off Keying (OOK) modem, a second OOK modem connected to the secondary controller and a corresponding multiplexer, and a plurality of antenna radio frequency (RF) ports. The multiplexer is connected to the plurality of antenna RF ports. The primary module is connected to the secondary controller through the first OOK modem. The primary module receives a Ping command transmitted by a base station, generates a Ping message, and transmits the Ping message to the secondary controller through the first OOK modem. The secondary controller transmits the received Ping message to the corresponding second OOK modem. The second OOK modem transmits the Ping message to a corresponding antenna RF port through the multiplexer. The antenna RF port feeds back a signal to the base station.

Embodiments of the present disclosure provide a method for implementing an antenna Ping function. The method includes receiving a Ping command transmitted by a base station by a primary module, generating a Ping message by the primary module, transmitting the Ping message to a secondary controller through a first OOK modem by the primary module, transmitting the received Ping message to a corresponding second OOK modem by the secondary controller, transmitting, the second OOK modem, the Ping message to a corresponding antenna RF port through a multiplexer, and feeding back a signal to the base station by the antenna RF port.

The beneficial effect of the present disclosure is as follows.

(1) The antenna AISG3.0 multi-channel Ping function may be implemented by the present disclosure. By arranging the multiplexer, one OOK modem may be connected to the plurality of antenna RF ports. Thus, there is no need to arrange an OOK modem for each antenna RF port individually. The number of the OOK modems used may be effectively reduced. The number of the OOK modems may be reduced to be less than ⅛, which may reduce the overall volume and the power consumption and save the manufacturing cost.

(2) In the antenna, the primary module is connected to the secondary module through a sub-miniature version A (SMA) interface, which can shield the signal well and be beneficial for the antenna PIM index.

(3) The secondary module may perform firmware upgrading remotely and smartly through the primary module to maintain the newest firmware.

(4) The second OOK modem and the corresponding multiplexer of the secondary module may be designed in modules, which may expand to 256 Ping ports at most.

BRIEF DESCRIPTION OF THE DRAWINGS

FIG. 1 is a schematic structural block diagram of a device for implementing an antenna Ping function according to some embodiments of the present disclosure.

DETAILED DESCRIPTION OF THE EMBODIMENTS

The technical solutions of embodiments of the present disclosure are described in detail in connection with the accompanying drawings of the present disclosure.

The present disclosure provides a device for implementing an antenna Ping function, which may implement an AISG3.0 multi-channel Ping function and effectively reduce a number of On-Off Keying (OOK) modems used. Thus, such a device may reduce the space occupied by the device inside the antenna while reduce the overall power consumption of the antenna to avoid waste of costs and resources.

FIG. 1 is a schematic structural block diagram of a device for implementing an antenna Ping function according to some embodiments of the present disclosure. The device includes a primary module and a secondary module that are communicatively connected to each other. The primary module includes a primary controller and a plurality of antenna interface standards groups (AISGs). An AISG interface is connected to the primary controller. A plurality of AISG interfaces are connected to at least one base station through AISG cables. During implementation, the base station may transmit a Ping command to the primary controller through the AISG cable. The primary controller may generate a Ping message after receiving the Ping command and transmit the Ping message to the secondary controller. The secondary controller may transmit the Ping message to the base station through a multiplexer, an OOK modem, and an antenna RF port. The base station may determine whether a malfunction exists in the link between the base station and the primary module based on the Ping message.

The secondary module includes a secondary controller, a first OOK modem, at least a second OOK modem, at least a multiplexer, and a plurality of antenna RF ports. The secondary controller is connected to the primary controller through the first OOK modem. Each second OOK modem is connected to the secondary controller. Each secondary OOK modem is connected to a corresponding multiplexer. Each multiplexer is connected to the plurality of antenna RF ports. During implementation, the primary controller may transmit the Ping message to the first OOK modem. The first OOK modem may process the Ping message and transmit the Ping message to the secondary controller. The secondary controller may further transmit the Ping message to the secondary OOK modem. The second OOK modem may process the Ping message and then transmit the Ping message to the corresponding antenna RF port through the multiplexer. The antenna RF port may feed the signal back to the base station through a biaser inside the antenna. Then, the base station may determine whether the antenna RF port has a stability problem.

In some embodiments, the multiplexer may include an all-solid-state multiplexer, which may be used to implement the multiplexing of the OOK modems. That is, the multiplexing may be implemented by a single channel modem, such as 8-channel, 16-channel, or 256-channel multiplexing. Compared to the prior art, an OOK modem may be connected to the plurality of antenna RF ports by arranging the multiplexer. There is no need to separately arrange an OOK modem for each antenna RF port, which effectively reduces the number of the OOK modems used and reduces the overall cost and volume of the antenna.

As shown in FIG. 1, the primary module and the secondary module communicate with each other through an OOK message link. The secondary module may communicate with the primary module through the OOK message link and upgrade the firmware of the secondary module. In some embodiments, the OOK message link includes a first subminiature version A (SMA) interface, a second SMA interface, and a coaxial cable connecting the first SMA interface and the second SMA interface. The coaxial cable may be configured to transmit an OOK signal and a DC signal. The first SMA interface is placed in the primary module. The first SMA interface is connected to the primary controller. The second SMA interface is placed in the secondary module. The second SMA interface is connected to the secondary controller through the first OOK modem.

The primary module and the secondary module may communicate by connecting the coaxial cable to an SMA connector to effectively shield the signal, which is beneficial to an antenna passive intermodulation (PIM) index. Thus, the problem of decreasing the antenna standing wave ratio and intermodulation performance may be avoided.

FIG. 1 shows an example of the secondary module to describe the present disclosure in detail. The secondary module includes a first OOK modem, two second OOK modems, two multiplexers, and 32 antenna RF ports.

The first SMA interface may be connected to the second SMA interface through the coaxial cable. In the primary module, the first SMA interface may be connected to the primary controller. In the secondary module, the second SMA interface may be connected to the secondary controller through the first OOK modem. The two second OOK modems are both connected to the secondary controller. Each second OOK modem is connected to a multiplexer. Each multiplexer may be connected to 16 antenna RF ports.

The base station may transmit a Ping command to the primary controller through the AISG interface during the antenna Ping. After receiving the Ping command, the primary controller may generate a Ping message and transmit the Ping message to the first OOK modem of the secondary module. The first OOK modem may process the Ping message and then transmit the Ping message to the secondary controller. The secondary controller may process the received Ping message and transmit the Ping message to the corresponding second OOK modem. The second OOK modem may perform modulation on the signal and transmit the signal to the corresponding multiplexer. The multiplexer may transmit the Ping message to the corresponding antenna RF port of the 16 antenna RF ports connected to the multiplexer. The antenna RF port may feed the signal back to the base station through the biaser inside the antenna. Thus, the base station may determine whether each RF path between the base station and the antenna is correctly connected, stable, and reliable.

In some embodiments, each of the primary module and the secondary module may include a power source module for providing power source, an electromagnetic compatibility (EMC) suppression module for EMC suppression, and a lightning protection module for lightning protection.

Further, the primary module may also include a motor drive module and a surge current suppression module. The motor drive module may be configured to control the motor inside the antenna to adjust the phase of the antenna. The surge current suppression module may be configured to suppress the surge current generated at the moment of power-on. The secondary module may also include an impedance matching module, which can be used to implement high-reliable communication between the antenna and the base station.

With the device for implementing the antenna Ping function of the present disclosure, on one hand, the number of OOK modems used may be reduced. The number of OOK modems may be reduced to be less than ⅛ of the number and saves the cost. On the other hand, the power consumption may be reduced. The power consumption may be reduced by more than 60%.

The technical contents and features of the present disclosure are disclosed above. Those skilled in the art should still make replacements and modifications without departing from the spirit of the present disclosure based on the teaching and embodiments of the present disclosure. Therefore, the scope of the present invention should not be limited to the content disclosed by embodiments of the present disclosure but include various replacements and modifications without departing the present disclosure and should be subjected to the claims of the invention.

What is claimed is:

1. A device for implementing an antenna Ping function comprising a primary module and a secondary module, wherein:

the secondary module includes a secondary controller, a multiplexer, a first On-Off Keying (OOK) modem, a second OOK modem connected to the secondary controller and a corresponding multiplexer, and a plurality of antenna radio frequency (RF) ports, the multiplexer being connected to the plurality of antenna RF ports; and the primary module is connected to the secondary controller through the first OOK modem;

the primary module receives a Ping command transmitted by a base station, generates a Ping message, and transmits the Ping message to the secondary controller through the first OOK modem;

the secondary controller transmits the received Ping message to the corresponding second OOK modem;

the second OOK modem transmits the Ping message to a corresponding antenna RF port through the multiplexer; and the antenna RF port feeds back a signal to the base station.

2. The device of claim 1, wherein the primary module includes:

a plurality of antenna interface standards group (AISG) interfaces configured to connect to the base station; and a primary controller connected to the plurality of AISG interfaces and receiving the Ping command transmitted by the base station via the plurality of AISG interfaces.

3. The device of claim 2, wherein the primary module is connected to at least one base station via the plurality of AISG interfaces.

4. The device of claim 2, wherein the primary module is connected to the secondary module through an OOK message link.

5. The device of claim 4, wherein the OOK message link includes:

a first interface module placed in the primary module and connected to the primary controller; and a second interface module connected to the first interface module, the second interface module being placed in the secondary module, and connected to the secondary controller through the first OOK modem.

6. The device of claim 5, wherein the first interface module and the second interface module include SMA (sub-miniature version A) interfaces.

7. The device of claim 1, wherein the antenna RF port feeds back the signal to the base station through a biaser.

8. The device of claim 1, wherein the second OOK modem is at most connected to 32 antenna RF ports through the corresponding multiplexer.

9. The device of claim 1, wherein the secondary module further includes an impedance matching module implementing communications between an antenna and the base station.

10. A method for implementing an antenna Ping function comprising:

receiving, by a primary module, a Ping command transmitted by a base station;

generating a Ping message by the primary module;

transmitting the Ping message to a secondary controller through a first OOK (on-off keying) modem by the primary module;

transmitting the received Ping message to a corresponding second OOK modem by the secondary controller;

transmitting, by the second OOK modem, the Ping message to a corresponding antenna RF (radio frequency) port through a multiplexer; and feeding back a signal to the base station by the antenna RF port.

11. The method of claim 10, wherein the primary module includes:

a plurality of antenna interface standards group (AISG) interfaces configured to connect to the base station; and a primary controller connected to the plurality of AISG interfaces and receiving the Ping command transmitted by the base station via the plurality of AISG interfaces.

12. The method of claim 11, wherein the primary module is connected to at least one base station via the plurality of AISG interfaces.

13. The method of claim 11, wherein the primary module is connected to the secondary module through an OOK message link.

14. The method of claim 13, wherein the OOK message link includes:

a first interface module placed in the primary module and connected to the primary controller; and a second interface module connected to the first interface module, the second interface module being placed in the secondary module, and connected to the secondary controller through the first OOK modem.

15. The method of claim 14, wherein the first interface module and the second interface module both include SMA (sub-miniature version A) interfaces.

16. The method of claim 10, further comprising:

feeding back the signal to the base station through a biaser using the antenna RF port.

17. The method of claim 10, wherein the second OOK modem is connected to 32 or fewer antenna RF ports through the corresponding multiplexer.

18. The method of claim 10, wherein the secondary module further includes an impedance matching module implementing communications between an antenna and the base station.

* * * * *